Oct. 11, 1949.  W. B. WELLS  2,484,136
COVER GLASS FOR LIGHT SIGNALS
Filed Sept. 30, 1947  2 Sheets-Sheet 2
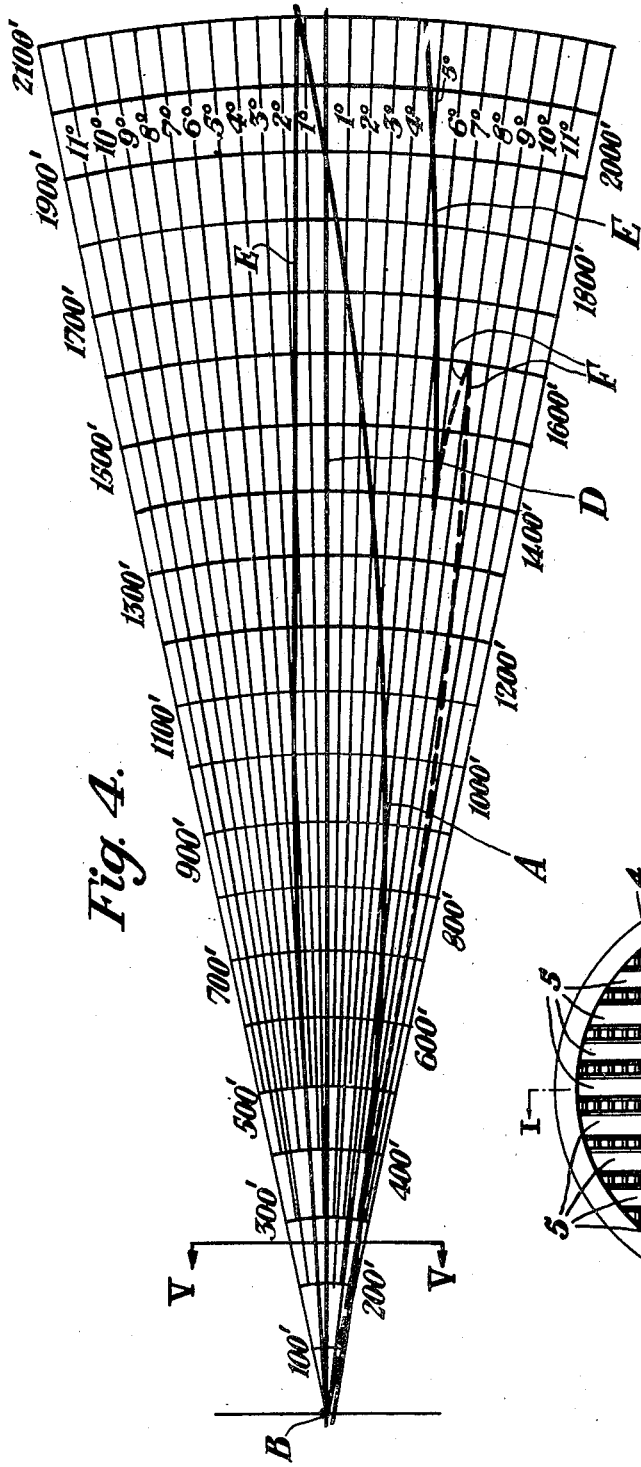
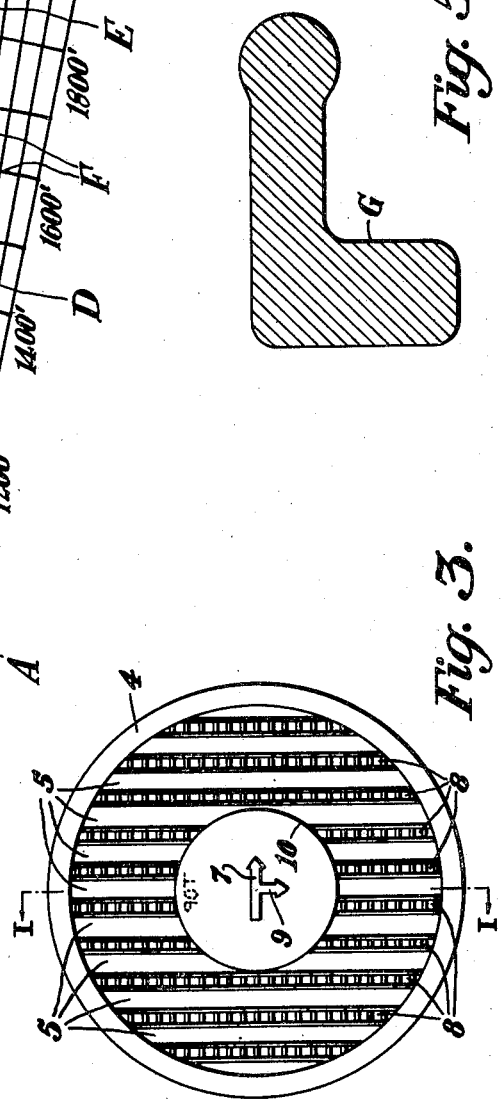
INVENTOR.
Wesley B. Wells.
BY
HIS ATTORNEY Patented Oct. 11, 1949

2,484,136

UNITED STATES PATENT OFFICE 2,484,136

COVER GLASS FOR LIGHT SIGNALS

Wesley B. Wells, Wilkinsburg, Pa., assignor to The Union Switch & Signal Company, Swissvale, Pa., a corporation of Pennsylvania Application September 30, 1947, Serial No. 777,066

5 Claims. (Cl. 177—329)

My invention relates to light signals, and particularly to light signals for use on a railway curve as a part of a railway signal system to provide the engineer of a train approaching the signal on the curve with an indication of traffic conditions in advance. More particularly, my invention relates to light signals of the type described which are to be mounted some distance above the eye level plane of an engineer approaching the signal.

Obviously, it is desirable that a signal of the type described should be visible to an engineer over all points on the curve approaching the signal. To render such a signal visible to the engineer over all points on the curve, it is necessary to spread the beam laterally and also to deflect it downwardly. The necessary spreading and downward deflection of the beam are usually accomplished by means of a cover glass supplemented by an auxiliary prismatic screen commonly referred to as a "close up" prism, and with the types of cover glasses heretofore available, the lateral spreading and downward deflection of the beam which has been provided to obtain a good indication in the range from 300 to 800 or 1000 feet in front of the signal has resulted in a weakening of the long range indication obtainable to an extent which materially decreased the utility of the signal.

One object of my invention is to provide an improved cover glass for a curve signal of the type described, which cover glass will cause the signal to provide an indication of substantially uniform intensity throughout all points on the curve in the engineer's eye level plane.

Another object of my invention is to provide a cover glass for a signal of the type described, which cover glass will increase the overall efficiency and range of the signal by confining the distribution of the light rays substantially to the locations necessary for indication purposes.

Another object of my invention is to provide a cover glass for a light signal of the type described, which cover glass will deflect the light rays laterally only for that portion of the beam which provides the long range indication and a part of the intermediate range indication and will deflect the light rays both laterally and downwardly for that portion of the beam which provides the intermediate range indication between the signal and the point where the engineer would be below the beam if no downward deflection of the beam were provided.

According to my invention, I provide the cover glass with vertical rows of prismatic corrugations, the rows being made up alternately of a single simple prism which deflects light laterally in one direction only and a series of compound prisms which deflect light both laterally in said one direction and also downwardly. The rows of simple prisms are preferably wider than the rows of compound prisms and transmit the light rays for the long range indication and a part of the intermediate range indication, while the compound prisms transmit the light for the intermediate range indication occurring between approximately 700 or 800 to 200 feet from the signal. The remainder of the indication from 200 feet to a point near the signal is provided by a "close up" prism associated with the cover glass. The simple prisms are so constructed that the angle of refraction of the light rays transmitted by these prisms will increase progressively from a minimum value at one edge to a maximum value at the other, and in a 10° deflecting cover glass, for example, are arranged to refract the light rays through a maximum angle of approximately 7° with the maximum intensity occurring at 0° and the minimum intensity at 7°. The compound prisms are likewise arranged so that the angle of refraction will increase progressively from one edge to the other and are also so arranged that the angle of refraction will increase progressively from the top edge to the bottom edge, these prisms in a 10° deflecting cover glass for example, being arranged to spread that portion of the beam which passes through them between 7° and 10° horizontally with the maximum intensity occurring at 7° and the minimum intensity at 10°; and to deflect this portion of the beam downwardly between 0° and 10° with the minimum intensity occurring at 9° or 10° and the maximum at 0°. It will be understood, of course, that for cover glasses having different degrees of spread a generally similar arrangement of prisms would be employed as conditions require, the important thing being that the simple prisms refract the light in the lateral direction only from the optical axis of the signal through a sufficient area to encompass that part of the curve at which it is desired to first have the signal become visible and an intermediate portion of the curve, while the compound prisms are arranged to refract the light laterally in an area to encompass that part of the curve beyond 200 feet from the signal not illuminated by the light transmitted by the simple prisms and also to spread these light rays downwardly through a sufficient angle so that the signal will remain visible as the engineer approaches close to the signal.

Other objects and characteristic features of my invention will become apparent as the description proceeds.

A cover glass embodying my invention is an improvement upon that shown and described in Letters Patent of the United States No. 1,227,778, granted to R. M. Gilson on May 29, 1917.

I shall describe a light signal provided with one form of cover glass embodying my invention, and shall then point out the novel features thereof in claims.

In the accompanying drawings, Fig. 1 is a vertical sectional view of a light signal provided with one form of cover glass embodying my invention. Fig. 2 is a sectional view taken on the line II—II of Fig. 1. Fig. 3 is a view of the cover glass shown in Figs. 1 and 2 as it appears when viewed from the left in Fig. 1. Fig. 4 shows a typical range spread curve for a light signal embodying my invention. Fig. 5 is an enlarged sectional view of the light beam emitted by a light signal embodying my invention taken approximately on the line V—V of Fig. 4.

Similar reference characters refer to similar parts in each of the several views.

Referring first to Figs. 1 and 2 the signal here shown comprises an incandescent lamp 1 from which a beam 2 of light comprising substantially parallel rays is projected by a lens 3. Although I have shown an incandescent lamp as the source of light, it is understood that any other suitable source may be employed; and although I have shown a lens for converting the light rays from the lamp 1 into a beam of substantially parallel rays, it is understood that any other suitable means may be employed for this purpose.

Located in the path of beam 2 is a cover glass 4 embodying my invention, the function of which is to refract certain ones of the parallel rays of light comprising the beam 2 in such directions that, when the signal is mounted on a railway curve some distance above the eye level plane of the engineer of a train approaching the signal on the curve, with the portion of the beam having the greatest intensity directed toward the zone at which it is first desired to have the signal become visible, the signal beam will be visible to the engineer from all points on the curve and will have a substantially uniform indication from any point at which it is viewed by the engineer.

As here shown, the cover glass 4 is provided with a smooth exterior surface to prevent the accumulation of dirt which would impair the efficiency of the signal, and has formed on its interior surface, preferably by molding, parallel rows of prismatic corrugations or ribs which accomplish the desired light refraction. It should be pointed out, however, that insofar as the ability of a cover glass embodying my invention to effect the desired light distribution is concerned, it is immaterial on which face of the cover glass the prismatic corrugations are formed. The rows of prismatic corrugations consist alternately of relatively wide vertically disposed simple prisms 5 which refract certain ones of the light rays of the beam 2 laterally with respect to the optical axis 6—6 of the signal, in the direction indicated by the arrow 7 molded on the cover glass (see Fig. 3), and a series of somewhat narrower prismatic steps or compound prisms 8 which refract other ones of the rays of light of the beam 2 both laterally and downwardly with respect to the optical axis of the signal. The fact that the cover glass also serves to refract certain of the rays downwardly is indicated on the cover glass by the arrow 9 molded thereon, as shown in Fig. 3. The rows of prisms 5 and 8 may cover the entire inner face of the cover glass, but I prefer to omit these prisms from a central circular area 10 of the cover glass to permit the use of a "close up" prism 11 for a purpose which will be explained more fully hereinafter.

The prisms 5 serve to transmit the light for the long range indication and a considerable part of the intermediate range indication of the signal, and the inner face of each prism is concave substantially as shown in Fig. 2 so that the angle of refraction varies progressively from a minimum value adjacent the right-hand edge of the prism, as viewed from the front of the signal, to a maximum value adjacent the opposite edge. This variation is represented by the lines 2a in Fig. 2 which indicate the direction of the light rays emerging from the prisms. It will be seen that the portion of the beam 2 projected by the prisms 5 is spread from the optical axis toward the left of the signal, as viewed from the front of the signal, and varies in intensity from a maximum value adjacent the edge of the prism having the smallest angle of refraction to a minimum value adjacent the edge having the greatest angle of refraction. It follows that insofar as that portion of the signal indication which is transmitted by the prisms 5 is concerned, the beam of transmitted light will have a maximum intensity along the optical axis of the signal, and the intensity will decrease progressively as the angle of refraction increases.

The prismatic steps for the compound prisms 8 are arranged to refract light laterally in the same direction as the prisms 5 beginning at an angle to the optical axis of the signal which is equal to or slightly less than the maximum angle of refraction of the light rays transmitted by the prisms 5 and extending to the maximum angle of refraction which it is desired to obtain from the signal by means of the cover glass. For example, in a cover glass which is designed to give a maximum horizontal spread of 10°, the prisms 5 may refract the light rays through an angle of from 0° to 7°, while the prisms 8 may refract the light rays through an angle of from 7° to 10°. The prisms 8 are further so designed that the intensity of the light rays which are refracted by these prisms will decrease progressively from a maximum value at the smallest angle of refraction to a minimum value at the greatest angle of refraction. This variation is indicated by the lines 2b in Fig. 2, which lines illustrate the directions of light rays in the horizontal plane after they are refracted by the prisms 8. It will be apparent, therefore, that the intensity of the beam as a whole, projected by the cover glass, will decrease progressively from a maximum value along the optical axis of the signal to a minimum value at the side of the beam having the greatest angle of refraction.

The compound prisms 8 in addition to spreading the light laterally in the manner just described also refract it downwardly through a sufficient angle so that the engineer will not move under the beam until he has approached to within approximately 200 feet of the signal. In a 10° deflecting cover glass, for example, for use on a signal intended to be mounted approximately 20 feet above the engineer's eye level plane, that is approximately 32 feet above the rails, the prisms 8 will usually be arranged to refract the light rays downwardly between 0° and 10°, the maximum intensity of the rays occurring at 0° and the minimum intensity occurring at between 9° and 10°. The downward refraction of the light rays produced by these prisms is indicated in Fig. 1 by the lines 2c.

Referring now to Fig. 4, I have here shown a typical horizontal range spread curve for one well-known form of signal provided with a 10° deflecting cover glass embodying my invention. This curve is plotted on polar coordinates and is superimposed on a 1° railroad curve represented by the line A. The signal is located at point B which is disposed approximately 8 feet to the right of the curve when viewed from a position on the curve approaching the signal. Moreover, the signal is mounted 32 feet above the rails of the railroad curve A or 20 feet above the engineer's eye level plane as he approaches the signal on the railroad curve. The optical axis of the signal is indicated by the line D which it will be noted intersects the railroad curve at approximately 1900 feet from the signal. Since it is desirable that the axis D at the point where it crosses the curve A be at the eye level plane of the engineer, it is necessary that the axis be inclined downwardly from the horizontal at a slight angle. The envelope of that portion of the range which is produced by the prisms 5 and which is in the engineer's eye level plane is indicated by the heavy full lines E, while the envelope of that portion of the range which is emitted by the prisms 8 and which is in the engineer's eye level plane are indicated by the dash lines F. It will be seen from Fig. 4 that under the illustrated conditions the engineer will move into the portion of the beam transmitted by the prisms 5 at about 2100 feet. If the prisms 8 were not provided he would emerge from the beam at or near 700 feet. However, due to the fact that the light rays refracted by the prisms 5 emerge into the light rays transmitted by the prisms 8, he will receive a continuous indication until he approaches within approximately 200 to 300 feet of the signal at which time he will move out of the indication insofar as that part of the beam which is provided by the cover glass 4 is concerned. To obtain an indication from this point up to the signal, the auxiliary prismatic screen or "close up" prism 11, referred to hereinbefore, may be employed. This screen is a well-known expedient, and may, for example, be similar to that shown and described in Letters Patent of the United States No. 1,689,655, granted to me on October 30, 1928, for Light signals. It is usually constructed to refract the light rays downwardly through an angle up to approximately 30° as indicated by the lines 2d in Fig. 1. The distribution of the light rays emitted by the cover glass 4 at the point where the engineer normally moves out of the beam is indicated by the cross section shown in Fig. 5, wherein the envelope of the light rays is shown by the line G.

It will be apparent that for curves having different degrees of curvature, different ranges can be obtained with the same cover glass, and that for wide curves, it is necessary to construct the cover glass to deflect the light rays through wider angles than is necessary for narrower curves. In all cases, however, the prisms 5 will be constructed to transmit the light for the long range indication and part of the intermediate range indication, while the prisms 8 will be constructed to transmit the light rays for the balance of the intermediate range indication up to within a predetermined distance of the signal, these latter prisms serving not only to deflect the light laterally but also downwardly through a sufficient angle to prevent the engineer from moving below the beam, it being noted that the only light which is refracted downwardly is that refracted by the prisms 8, and that since this light is only refracted downwardly to obtain that portion of the indication which is visible to the engineman when he has approached relatively close to the signal, it is not essential that this portion of the beam have a high intensity. It follows that a cover glass embodying my invention distributes the light only where it is needed so that there is little if any wasted light. Consequently, my cover glass provides a maximum range to be obtained consistent with a uniform indication throughout the range provided by the cover glass.

Although I have herein shown and described only one form of light signal embodying my invention, it is understood that various changes and modifications may be made therein within the scope of the appended claims without departing from the spirit and scope of my invention.

Having thus described my invention, what I claim is:

1. A cover glass adapted to be interposed in a beam of parallel rays of light and provided with prisms for refracting certain ones of the light rays laterally in one direction through a predetermined angle of spread in such manner that the intensity of the light rays will decrease progressively as the angle of refraction increases and with other prisms for refracting other ones of the light rays laterally in said one direction through a further angle of spread beginning with the maximum angle of spread provided by said first mentioned prisms in such manner that the intensity of the light rays will decrease progressively as the angle of refraction increases, said other prisms also serving to refract light rays downwardly through a predetermined angle of spread.

2. A cover glass adapted to be interposed in a beam of parallel rays of light and provided with alternate vertical rows of simple and compound prisms, said simple prisms being constructed to refract light in one direction only through a predetermined angle of spread, and said compound prisms being constructed to refract light laterally in said one direction through a further angle of spread beginning with the maximum angle of spread provided by said first means and also to refract light downwardly through a predetermined angle of spread.

3. In a cover glass for use in a railroad curve signal mounted above the eye level plane of an engineer approaching the signal on the curve, the combination of a first series of vertical prisms disposed in rows on one face of said cover glass, each said prism having an angle of refraction which increases progressively in one direction from a minimum value adjacent one side to a maximum value adjacent the other side, and a second series of prisms disposed in rows located between the rows of the first series and each having an angle of refraction which increases progressively for a minimum value adjacent one side to a maximum value adjacent the other side and from a minimum value adjacent the top to a minimum value adjacent the bottom, the minimum angle of refraction at said one side of the prisms of the second series being equal to the maximum angle of refraction at said other side of the prisms of the first series, whereby the light from a beam of parallel rays impinging on said cover glass is spread laterally only by the prisms of the first series and both laterally and downwardly by the prisms of the other series.

4. In a cover glass for use in a railroad curve signal mounted out of the eye level plane of an engineer approaching the signal on the curve, the combination of a first series of vertically disposed prisms on one face of said cover glass, the angle of refraction of each of which prisms increases progressively in one direction from a minimum value adjacent one side of the prism to a maximum value adjacent the other, and a second series of vertically disposed prisms on said one face of said cover glass, the angle of refraction of each of which prisms in said second series increases progressively both in said one direction from a minimum value adjacent one side of the prism to a maximum value adjacent its opposite side and in another direction from a minimum value adjacent another side of the prism to a maximum value adjacent its opposite side, the minimum refractive angle in said one direction for the prisms in said second series being approximately equal to the maximum refractive angle for the prisms in said first series.

5. As a new article of manufacture, a deflecting cover glass for a light signal provided on one face with a plurality of vertical rows of simple prisms alternated with vertical rows of compound prisms, said simple prisms being constructed to refract the light rays of a beam of parallel rays impinging thereon horizontally from an angle of 0° to an angle of 7° with the maximum intensity occurring at 0° and the minimum intensity at 7°, and the compound prisms being constructed to refract the light rays of a beam of parallel rays impinging thereon horizontally from an angle of 7° to an angle of 10° with the maximum intensity occurring at 7° and the minimum intensity occurring at 10° and also vertically from an angle of 0° to an angle of 10° with the maximum intensity occurring at 0° and the minimum intensity occurring at 10°.

WESLEY B. WELLS.

REFERENCES CITED

The following references are of record in the file of this patent:

UNITED STATES PATENTS

| Number | Name | Date |
| --- | --- | --- |
| 1,227,778 | Gilson | May 29, 1917 |
| 1,689,655 | Wells | Oct. 30, 1928 |
| 1,878,273 | Fisher et al. | Sept. 20, 1932 |
| 2,068,805 | Libby | Jan. 26, 1932 |